US012578511B1

(12) United States Patent
Topliss et al.

(10) Patent No.: US 12,578,511 B1
(45) Date of Patent: Mar. 17, 2026

(54) SAG COMPENSATION FOR DEFORMABLE LENS

(71) Applicant: Apple Inc., Cupertino, CA (US)

(72) Inventors: Richard J. Topliss, Cambridge (GB); James E. Pedder, Thame (GB); Michael D. Simmonds, Ashford (GB)

(73) Assignee: Apple Inc., Cupertino, CA (US)

( * ) Notice: Subject to any disclaimer, the term of this patent is extended or adjusted under 35 U.S.C. 154(b) by 642 days.

(21) Appl. No.: 17/343,602

(22) Filed: Jun. 9, 2021

Related U.S. Application Data

(60) Provisional application No. 63/036,914, filed on Jun. 9, 2020.

(51) Int. Cl.
| | |
|---|---|
| *G02B 7/22* | (2021.01) |
| *G02B 3/00* | (2006.01) |
| *G02B 3/14* | (2006.01) |
| *G02B 7/02* | (2021.01) |
| *G02B 26/00* | (2006.01) |

(52) U.S. Cl.
CPC ............. *G02B 3/0087* (2013.01); *G02B 3/14* (2013.01); *G02B 7/021* (2013.01); *G02B 7/22* (2013.01); *G02B 26/004* (2013.01)

(58) Field of Classification Search
CPC .......... G02B 3/12; G02B 3/14; G02B 3/0087; G02B 7/021; G02B 7/22; G02B 26/004; F04B 43/046; A61F 2/1635; A61F 2/1624; A61F 2/1613; A61F 2/1601; G02C 7/041; G02C 7/049; G02C 7/061; G02C 7/081; G02C 7/083; G02C 7/085; G02C 11/10
See application file for complete search history.

(56) References Cited

U.S. PATENT DOCUMENTS

| | | | | |
|---|---|---|---|---|
| 7,986,466 B2* | 7/2011 | Lee | .......................... | G02B 3/14 |
| | | | | 359/666 |
| 2001/0017985 A1* | 8/2001 | Tsuboi | ................. | G02B 26/005 |
| | | | | 348/E5.04 |
| 2006/0041307 A1* | 2/2006 | Esch | ..................... | A61F 2/1613 |
| | | | | 623/6.37 |
| 2006/0262431 A1 | 11/2006 | Ohsato | | |
| 2009/0128922 A1* | 5/2009 | Justis | ................... | G02B 26/005 |
| | | | | 417/322 |

(Continued)

FOREIGN PATENT DOCUMENTS

| | | | | | |
|---|---|---|---|---|---|
| CN | 101632030 B | * | 1/2012 | ......... | G02B 26/0875 |

*Primary Examiner* — Bumsuk Won
*Assistant Examiner* — Samanvitha Sridhar
(74) *Attorney, Agent, or Firm* — S. Scott Foster; Kowert, Hood, Munyon, Rankin & Goetzel, P.C.

(57) ABSTRACT

Various embodiments include a sag compensation structure that may be used to compensate for gravity sag of a deformable lens membrane. In some embodiments, the sag compensation structure may be combined with a lens assembly comprising the deformable lens membrane. The sag compensation structure may include one or more sag compensation membranes that may interface with fluids to provide the gravity sag compensation. According to some embodiments, the lens assembly may include a lens that corrects for one or more optical aberrations of the deformable lens membrane. The sag compensation structure may be disposed between the deformable lens membrane and the lens that corrects for the optical aberration(s), in some embodiments.

18 Claims, 16 Drawing Sheets

(56)                    References Cited

U.S. PATENT DOCUMENTS

2010/0039709  A1*    2/2010  Lo ....................... G02B 13/009
                                                      359/665
2010/0202054  A1*    8/2010  Niederer ................. G02B 3/14
                                                      359/666
2021/0325575  A1*   10/2021  Niederer ................. G02B 3/14

* cited by examiner

Optics System
100

120

First Cavity
112

122

Second Cavity

First Lens/
Deformable Lens
Membrane
104

114
118
116

Optical Axis

Actuator(s)
110

Sag Compensation Structure 106
102

106
Second Lens

Flexible
Structure
108

400

600b

Spot Diagram

612

600a

614

612

Paraxial Eyepiece
616

606

604

602

608

610

SAG COMPENSATION FOR DEFORMABLE LENS

BACKGROUND

This application claims benefit of priority to U.S. Provisional Application Ser. No. 63/036,914, entitled "SAG COMPENSATION FOR DEFORMABLE LENS," filed Jun. 9, 2020, and which is incorporated herein by reference in its entirety.

TECHNICAL FIELD

This disclosure relates generally to a sag compensation structure that compensates for gravity sag of a deformable lens membrane.

DESCRIPTION OF THE RELATED ART

Optics systems may be used in various types of devices and applications. A camera in a mobile multifunction device, for example, may include an optics system and an image sensor. An optics system may include one or more optical elements, such as a lens. Some optics systems may include a deformable membrane that functions as a lens. In some systems, an actuator may be used to change the shape of the deformable membrane to vary the optical power and/or other optical characteristics of the lens.

BRIEF DESCRIPTION OF THE DRAWINGS

FIG. 1A shows a cross-sectional view of the optics system. FIG. 1B shows a perspective view of the optics system. FIG. 1C shows a cross-sectional view of an example sag compensation structure. FIG. 1D shows a perspective view of the sag compensation structure.

FIG. 6A shows a schematic diagram of light rays passing through the optics system. FIG. 6B shows a spot diagram of the light after passing through the optics system.

FIG. 7A shows a schematic diagram of light rays passing through the optics system. FIG. 7B shows a spot diagram of the light after passing through the optics system.

FIG. 8A shows a schematic diagram of light rays passing through the optics system. FIG. 8B shows a spot diagram of the light after passing through the optics system.

FIGS. 10A-12B illustrate example optical scenarios in which light passes through an optics system (e.g., including a deformable lens membrane and/or a sag compensation structure) with compensated gravity sag at different optical powers, in accordance with some embodiments. FIGS. 10A, 11A, and 12A show schematic diagrams of light rays passing through the optics systems at respective optical powers. FIGS. 10B, 11B, and 12B show spot diagrams of the light after passing through the optics system at the optical powers corresponding to those of FIGS. 10A, 11A, and 12A, respectively.

Figure 1A:
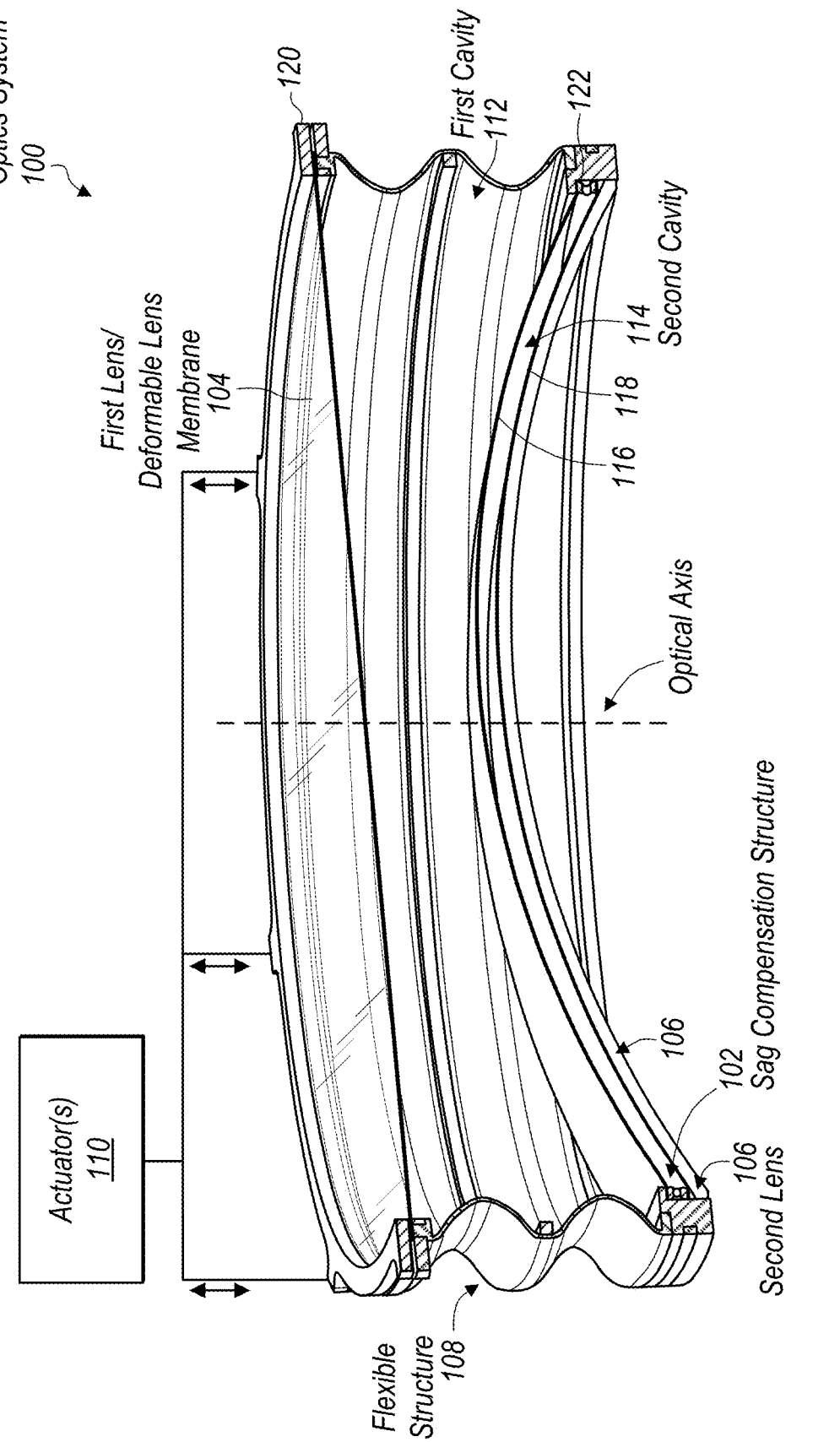
FIGS. 1A-1D illustrate an example optics system that may include a deformable lens membrane and a sag compensation structure, in accordance with some embodiments.
Figure 1B:
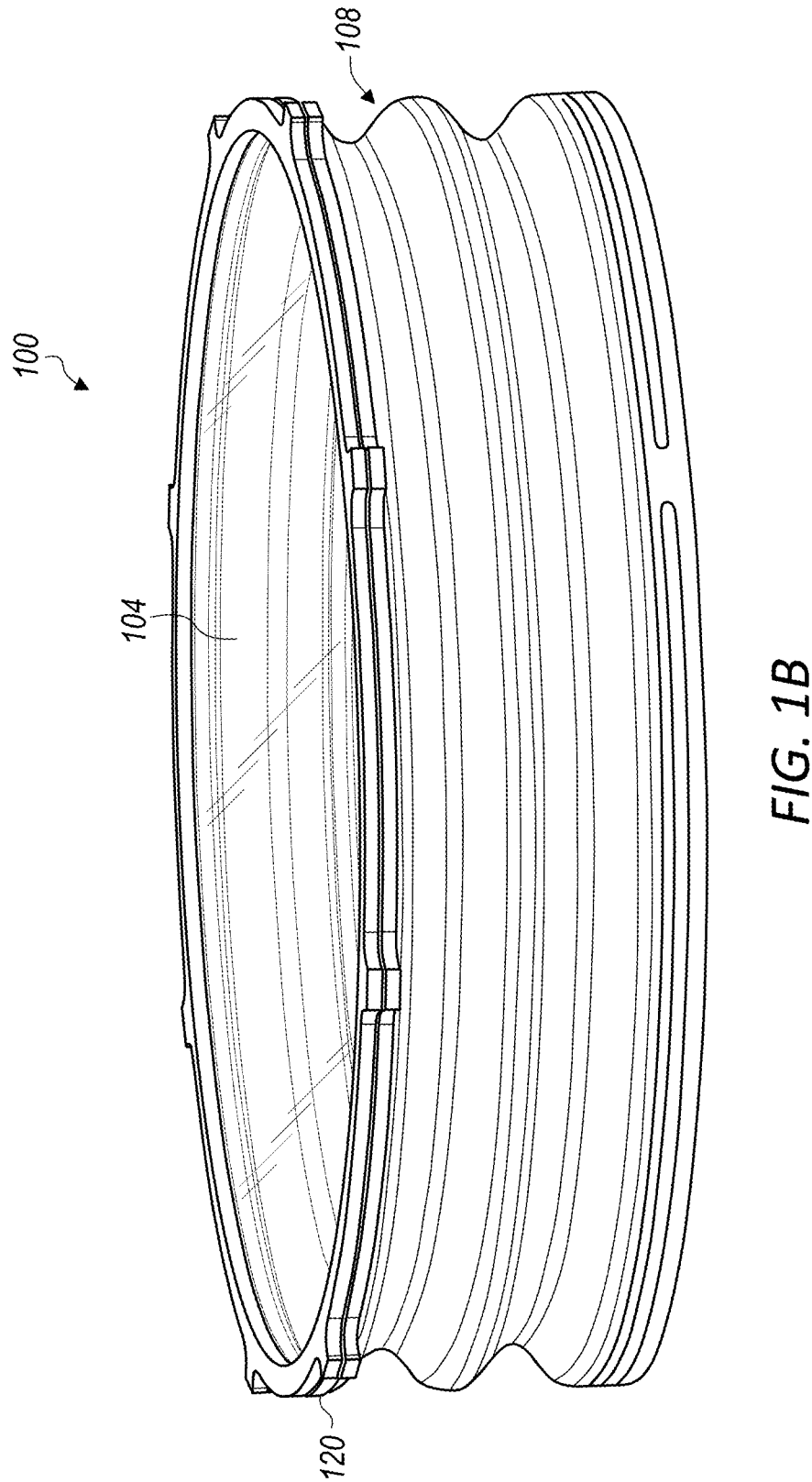
Figure 1C:
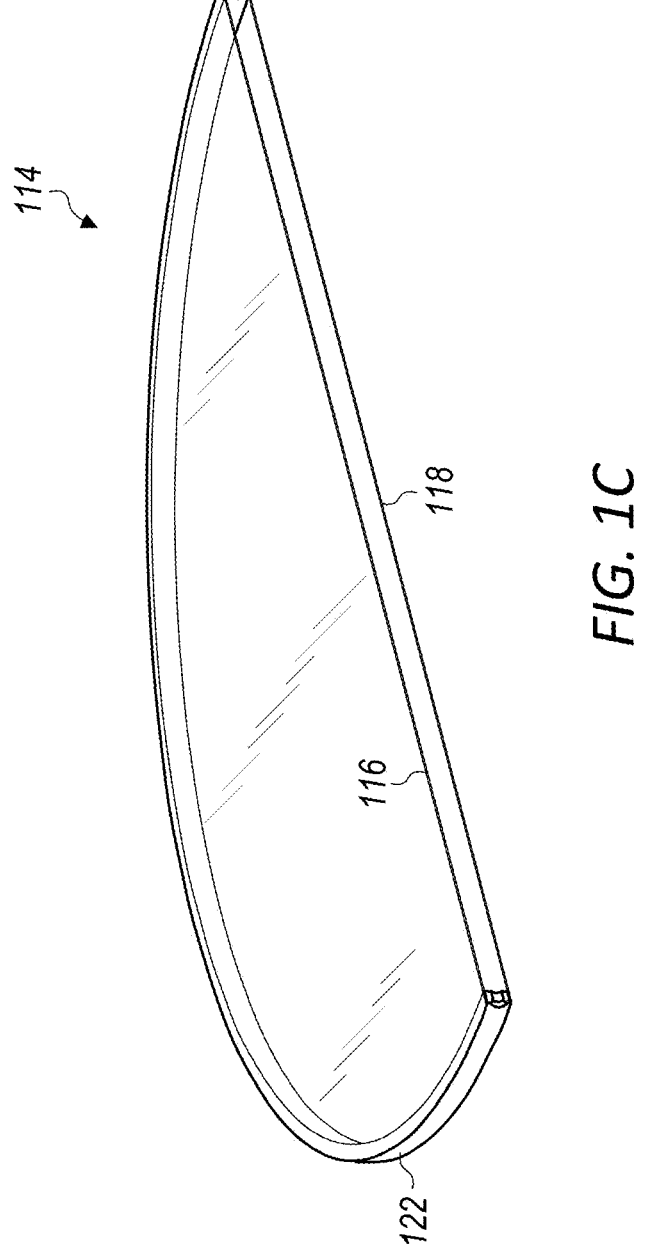
Figure 1D:
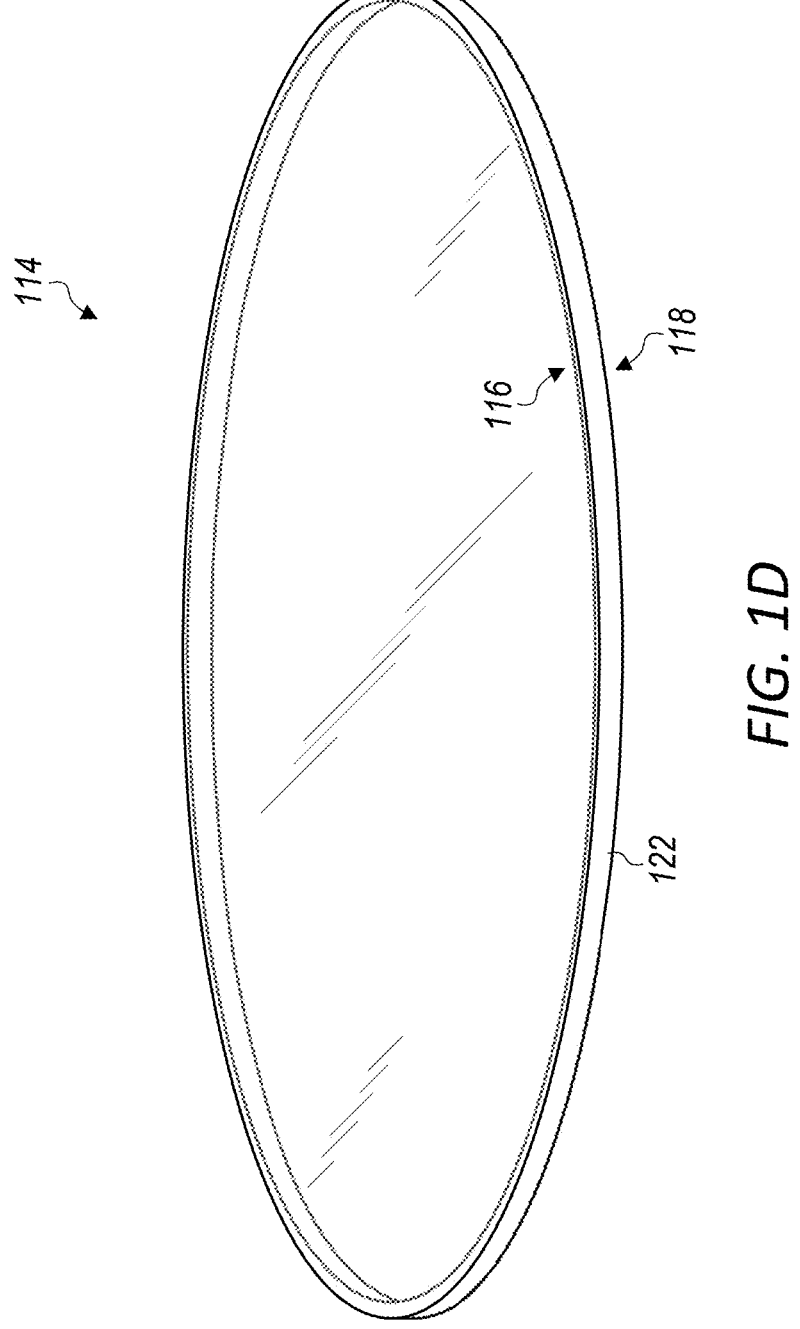

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to a sag compensation structure that may be used to compensate for gravity sag of a deformable lens membrane. In some embodiments, the sag compensation structure may be combined with a lens assembly comprising the deformable lens membrane. The sag compensation structure may include one or more sag compensation membranes that may interface with fluids to provide the gravity sag compensation.

In various embodiments, the sag compensation structure and the lens assembly may be included in an optics system (and/or a device) in which fluids are contained withing respective cavities. For example, the optics system may be used to correct for eye prescription in some embodiments. According to some embodiments, the lens assembly may include a first lens (e.g., comprising the deformable lens membrane) and/or a second lens. In some examples, the first lens may be configured to correct for eye prescription, the second lens may be configured to correct for one or more optical aberrations induced by the first lens (e.g., field curvature), and the sag compensation structure may be configured to correct for gravity sag of the first lens. For example, gravity sag of the deformable lens membrane may lead to one or more optical aberrations (e.g., coma aberrations) that vary based on an orientation of the deformable lens membrane. The sag compensation structure may be used to correct for such optical aberrations caused by gravity sag of the deformable lens membrane.

In some embodiments, the first lens, the sag compensation structure, and the second lens may be positioned along an optical axis of the lens assembly. For example, the optical axis may be defined by the first lens. The sag compensation structure may be positioned, along the optical axis, between the first lens and the second lens. According to some embodiments, the second lens may comprise a curved lens (e.g., a meniscus lens). Furthermore, a curved surface of the second lens may be placed against the sag compensation structure, thereby deforming at least a portion of the sag compensation structure. For example, the curved surface of the second lens may abut the sag compensation structure and deform one or more sag compensation membranes of the sag compensation structure (e.g., in a dome-like shape) towards the first lens. In some embodiments, the first lens, the sag compensation structure, and the second lens may be coupled with a flexible structure (e.g., comprising one or more bellows) may partly define the cavities within which fluids are contained. Additionally, or alternatively, the flexible structure may be flexible so as to allow relative movement between components of the optics system, e.g., movement of the first lens relative to the second lens and/or the sag compensation structure.

In some embodiments, the sag compensation structure may include one or more sag compensation membranes configured to deform, e.g., to compensate for gravity sag of the deformable lens membrane. In some embodiments, a sag compensation membrane of the sag compensation structure may deformably interface with a first fluid contained between the deformable lens membrane and the sag compensation membrane. Furthermore, the sag compensation membrane may deformably interface with a second fluid contained between the sag compensation membrane and the second lens. According to various embodiments, the sag compensation structure may include a first sag compensation membrane and a second sag compensation membrane. One or more rings (and/or other support structure(s)) may extend around the first sag compensation membrane and the second sag compensation membrane, e.g., so as to space the outer peripheries of the sag compensation membranes from each other in the direction of the optical axis. The first compensation membrane and the second compensation membrane may be oriented parallel with one another when attached to the support structure(s). In some embodiments, the second fluid may be contained within a cavity defined by the first sag compensation membrane, the second sag compensation membrane, and the support structure(s).

According to various embodiments, the second fluid may have one or more properties and/or characteristics that are different than the first fluid. For example, the second fluid may have a different density and/or a different refractive index than the first fluid. According to some non-limiting examples, the second fluid may have a higher density than the first fluid. Additionally, or alternatively, the second fluid may have a lower refractive index than the first fluid.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

As mentioned above, various embodiments include a sag compensation structure that compensates for gravity sag of a deformable lens membrane in an optics system. FIGS. 1A-1D illustrate an example of such an optics system 100. According to various embodiments, the optics system 100 may include a sag compensation structure 102 along with a first lens 104 (e.g., comprising a deformable lens membrane) and/or a second lens 106. In some examples, the first lens 104 and/or the second lens 106 may be considered to be part of a lens assembly. In some embodiments, the optics system 100 may include a flexible structure 108 (e.g., comprising one or more bellows) and/or one or more actuators 110 (e.g., voice coil motor actuator(s) and/or piezoelectric actuator(s), etc.). One or more components of the optics system 100 (e.g., the sag compensation structure 102, the first lens 104, and/or the second lens 106) may be coupled with the flexible structure 108 and/or with one another (e.g., via the flexible structure 108), e.g., as indicated in FIG. 1A. The actuator(s) 110 may be used to move one or more portions of the optical system 100 relative to one or more other portions of the optical system 100.

In some embodiments, the sag compensation structure 102, the first lens 104, and/or the second lens 106 may be positioned along an optical axis of the optics system 100. Furthermore, as indicated in FIG. 1A, the sag compensation structure 102 may be positioned between the first lens 104 and the second lens 106.

As will be discussed in further detail below (e.g., with reference to FIGS. 2A-3), the optics system 100 may include fluids. Displacement of such fluids (e.g., via actuator(s) 110, gravity, etc.) may impose forces causing one or more membranes to deform, which may in turn alter one or more optical characteristics of the optics system 100. In some embodiments, a first fluid (not shown) may be contained within a first cavity 112, and a second fluid (not shown) may be contained within a second cavity 114. The first cavity 112 may be located between the first lens 104 and the sag compensation structure 102. For example, the first cavity 112 may be at least partially defined by the deformable lens membrane, a sag compensation membrane, and/or the flexible structure 108. Displacement of the first fluid may cause the deformable lens membrane (adjacent to the first fluid) to deform, e.g., based at least in part on actuation of the actuator(s) 110 to change the optical power of the optics system 100, and/or based at least in part on gravity sag (which may undesirably alter one or more optical characteristics of the optics system 100).

The second cavity 114 may be located between membranes of the sag compensation structure 102. For example, the second cavity 114 may be at least partially defined by a first sag compensation membrane 116, a second sag compensation membrane 118, and/or the flexible structure 108. Additionally, or alternatively, the second cavity 114 may be located between the sag compensation structure 102 and the second lens 106. For example, the second cavity 114 may be at least partially defined by a sag compensation membrane, the second lens 106, and/or the flexible structure 108. Displacement of the second fluid may cause the sag compensation membrane(s) (adjacent to the second fluid) to deform, e.g., based at least in part on actuation of the actuator(s) 110 and/or gravity sag. In various embodiments, the sag compensation structure 102 may be configured such that deformation of the sag compensation membrane(s) compensates for gravity sag of the deformable lens membrane (e.g., sag of the deformable lens membrane due to gravity).

According to various embodiments, the first fluid and the second fluid may be different from each other (e.g., with respect to one or more properties/characteristics of the fluids). In some non-limiting examples, the first fluid may have a different density and/or a different refractive index than the second fluid. For example, the first fluid may have a lower density than the second fluid. Additionally, or alternatively, the first fluid may have a higher refractive index than the second fluid. The first fluid and the second fluid may have one or more other differences in properties and/or characteristics in various embodiments.

As previously noted, the first lens 104 may comprise a deformable lens membrane. In some embodiments, the deformable lens membrane may be attached to the flexible structure 108 via a coupling structure 120. The coupling structure 120 may extend around at least a portion of a periphery of the deformable lens membrane. In some embodiments, the coupling structure 120 may be annular-shaped and/or may encircle the deformable lens membrane, e.g., as indicated at least in FIGS. 1A-1D. The coupling structure 120 may be attached to the deformable lens membrane (and may be considered part of the first lens 104 in some cases). Furthermore, the coupling structure 120 may be attached to the flexible structure 108, e.g., so as to couple the deformable lens membrane (and/or the first lens 104) to the flexible structure 108.

In various embodiments, the actuator(s) 110 may be attached to one or more portions of the coupling structure 120, such that the actuator(s) 110 are coupled to, and capable of influencing movement and/or positioning of, the deformable lens membrane. In some embodiments, the actuator(s) 110 may be attached to multiple portions of the coupling structure 120 and may be controllable (e.g., via control signals from a controller of the optics system and/or a controller of a device comprising the optics system) to cause the respective portions of the coupling structure 120 to move in directions of the optical axis and/or in directions orthogonal to the optical axis, e.g., to vary the optical power and/or otherwise vary one or more optical characteristics of the optics system 100. In some embodiments, the actuator(s) 110 at respective actuation points (e.g., respective portions of the coupling structure 120 to which the actuator(s) are attached) may be individually controllable, e.g., such that movement of one actuation point may be different (e.g., in timing, direction, etc.) than movement of another actuation point.

In various embodiments, the sag compensation structure 102 may include one or more sag compensation membranes. The sag compensation membrane(s) may deformably interface with fluids, such as the first fluid and the second fluid. The term "deformably interface" may be used herein to refer to a membrane interfacing with one or more components (e.g., including, but not limited to, one or more fluids) that may cause deformation of the membrane. In some non-limiting embodiments, the first sag compensation membrane 116 may directly interface with the first fluid and the second fluid, e.g., via direct contact between the first sag compensation membrane 116 and each of the first fluid and the second fluid. In some non-limiting embodiments, the second sag compensation membrane 118 may directly interface with the second fluid, e.g., via direct contact between the second sag compensation membrane 118 and the second fluid. In other embodiments, the sag compensation structure 102 may include a sag compensation membrane, with the second fluid contained between the sag compensation membrane and the second lens 106 (e.g., as indicated at least in FIG. 3), and the sag compensation membrane may directly interface with the first fluid and the second fluid.

In some embodiments, the sag compensation structure 102 may include a support structure 122 that extends around at least a portion of a respective outer periphery of one or more sag compensation membranes. For example, the support structure 122 may be attached to, and surround, the first sag compensation membrane 116 and the second sag compensation membrane 118, so as to form one or more side walls of the sag compensation structure 102. In such embodiments, the second cavity 114 (within which the second fluid may be contained) may be defined by the first sag compensation membrane 116, the second sag compensation membrane 118, and the support structure 122. In some embodiments, the sag compensation structure 102 may be attached to the flexible structure 108 via the support structure 122, e.g., as indicated in FIG. 1A.

According to some embodiments, the second lens 106 may comprise a curved lens (e.g., a meniscus lens). Furthermore, a curved surface of the second lens 106 may be placed against the sag compensation structure 102, thereby deforming at least a portion of the sag compensation structure 102. For example, the curved surface of the second lens 106 may abut the sag compensation structure and deform one or more sag compensation membranes of the sag compensation structure 102 (e.g., in a dome-like shape) towards the first lens 104. In various embodiments, the second lens 106 may be a lens having a fixed shape. However, in other embodiments, the second lens 106 may have a variable shape. For example, the second lens 106 may comprise another deformable lens membrane in some embodiments.

Figures 2A, 2B, 2C:
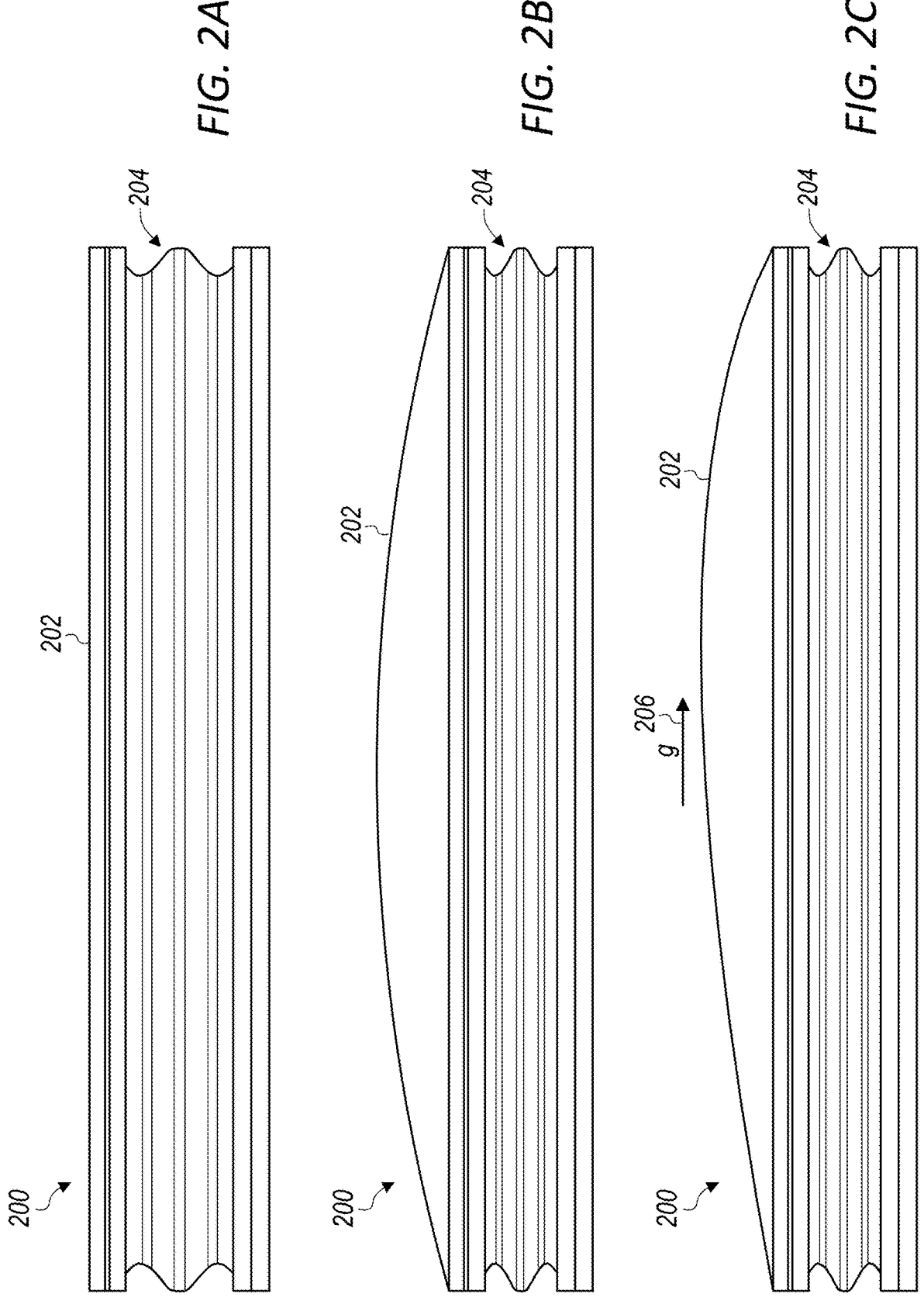
FIGS. 2A-2C illustrate side views of an example optics system that may include a deformable lens membrane and a sag compensation structure, in accordance with some embodiments.

FIGS. 2A-2C illustrate side views of an example optics system 200 that may include a deformable lens membrane 202 (e.g., the first lens 104 in FIG. 1A) and a sag compensation structure (e.g., the sag compensation structure 102 in FIG. 1A). In various embodiments, the optics system 200 may be similar to, or the same as, the optics system 100 described herein with reference to FIGS. 1A-1D. FIG. 2A shows the optics system 200 in an example expanded state. FIG. 2B shows the optics system 200 in an example contracted state, without gravity sag of the deformable lens membrane 202. FIG. 2C shows the optics system 200 in an example contracted state, with gravity sag of the deformable lens membrane 202.

In some embodiments, the optics system 200 may include a flexible structure 204 (e.g., the flexible structure 108 in FIG. 1A) that may expand and/or contract, e.g., along an optical axis of the optics system 200. According to some examples, one or more actuators (e.g., the actuator(s) 110 in FIG. 1A) may be controlled so as to move portions of the optics system 200, which may result in expansion and/or contraction of the flexible structure 204. While not visible FIGS. 2A-2C, an interior of the optics system 200 may include the sag compensation structure, a second lens (e.g., the second lens 106 in FIG. 1A), and fluids (e.g., fluids 308 and 310 in FIG. 3). The deformable lens membrane 202, the sag compensation structure, and/or the second lens may be coupled with the flexible structure 204. In some embodiments, expansion and/or contraction of the flexible structure 204 may allow relative movement between components of the optics system 200. For example, the flexible structure 204 may allow the deformable lens membrane 202 to move relative to the sag compensation structure and/or the second lens.

In some examples, the deformable lens membrane 202 may be flat when the optics system 200 is in the expanded state, as indicated in FIG. 2A. As the optics system 200 and/or the flexible structure 204 contracts (e.g., along the optical axis), one or more fluids within the optics system 200 may push out against the deformable lens membrane 202, thereby causing the flexible lens membrane 202 to bulge outward (e.g., in a dome-like shape), e.g., as indicated in FIG. 2B. When subjected to gravity (e.g., in the direction 206 indicated by the arrow in FIG. 2C), the shape of the deformable lens membrane may be altered, e.g., from the symmetric, dome-like shape shown in FIG. 2B to the asymmetric shape shown in FIG. 2C. As indicated in FIG. 2C, gravity may displace the fluid(s) in the direction 206, which may correspondingly cause one portion of the deformable lens membrane 202 to bulge outward more than another portion.

Figure 3:
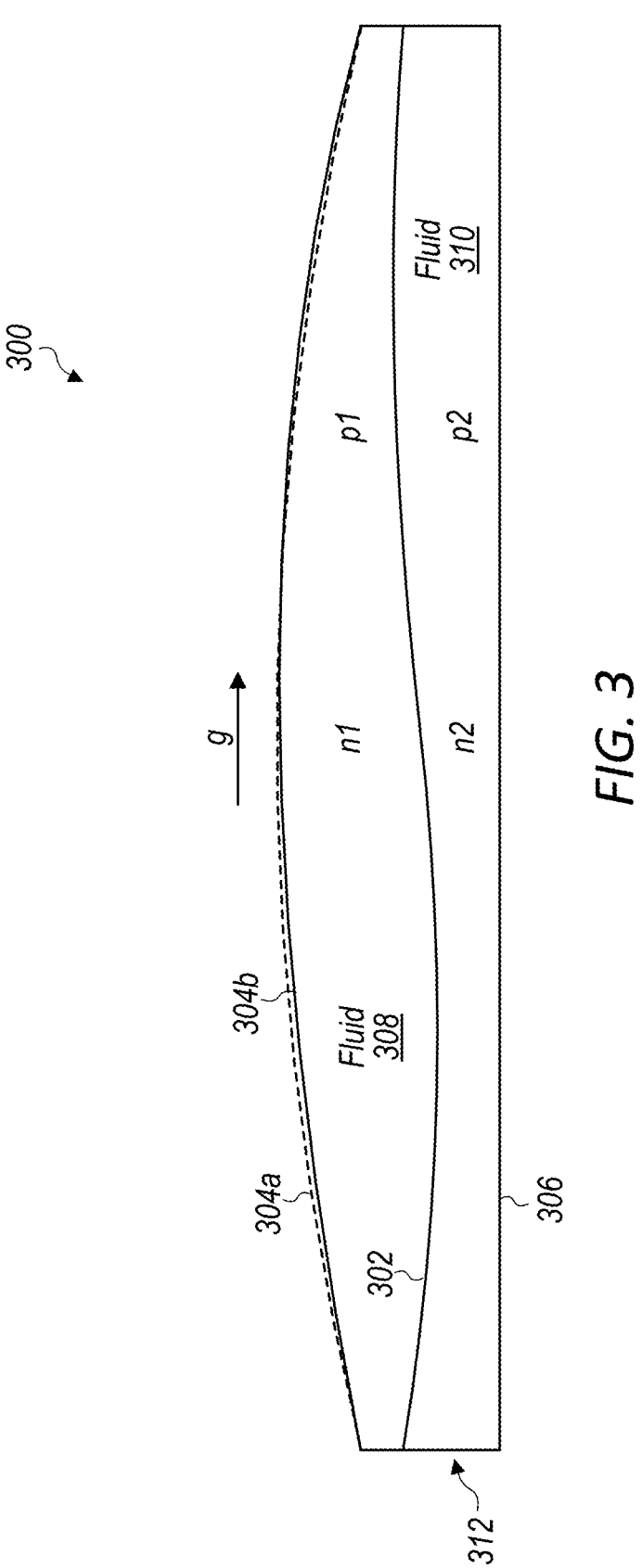
FIG. 3 illustrates an example of a sag compensation structure compensating for gravity sag of a deformable lens membrane, in accordance with some embodiments.

FIG. 3 illustrates an example 300 of a sag compensation structure compensating for gravity sag of a deformable lens membrane. In the example 300, the sag compensation structure may include at least one sag compensation membrane 302. The sag compensation membrane 302 may be positioned between a first lens (e.g., comprising the deformable lens membrane 304) and a second lens 306 (and/or a substrate).

In some embodiments, a first fluid 308 may be contained between the deformable lens membrane 304 and the sag compensation membrane 302. Furthermore, a second fluid 310 may be contained between the sag compensation membrane 302 and the second lens 306. According to some embodiments, the first fluid 308 may be contained within a first cavity that may be at least partially defined by the sag compensation membrane 302, the deformable lens membrane 304, and/or one or more side walls 312 (e.g., the flexible structure 108 in FIG. 1). The second fluid 310 may be contained within a second cavity that may be at least partially defined by the sag compensation structure. As indicated in the example 300, the second cavity may be at least partially defined by the sag compensation membrane 302, the second lens 306, and/or the side wall(s) 312. In various embodiments, the first fluid 308 may be different from the second fluid 310. For example, the first fluid may have a first density $\rho1$, and the second fluid 310 may have a second density $\rho2$ that is different than the first density $\rho1$. In some examples, the second density $\rho2$ of the second fluid 310 may be greater than the first density $\rho1$ of the first fluid 308. Additionally, or alternatively, the first fluid 308 may have a first refractive index n1, and the second fluid 310 may have a second refractive index n2 that is different than the first refractive index n1. In some examples, the second refractive index n2 of the second fluid 310 may be lower than the first refractive index of the first fluid 308. According to some embodiments, the first fluid 308 and/or the second fluid 310 may be selected, e.g., based at least in part on: one or more design objectives/requirements/constraints, one or more properties/characteristics of the deformable lens membrane 304, and/or one or more properties/characteristics of the sag compensation structure, etc.

Figure 4:
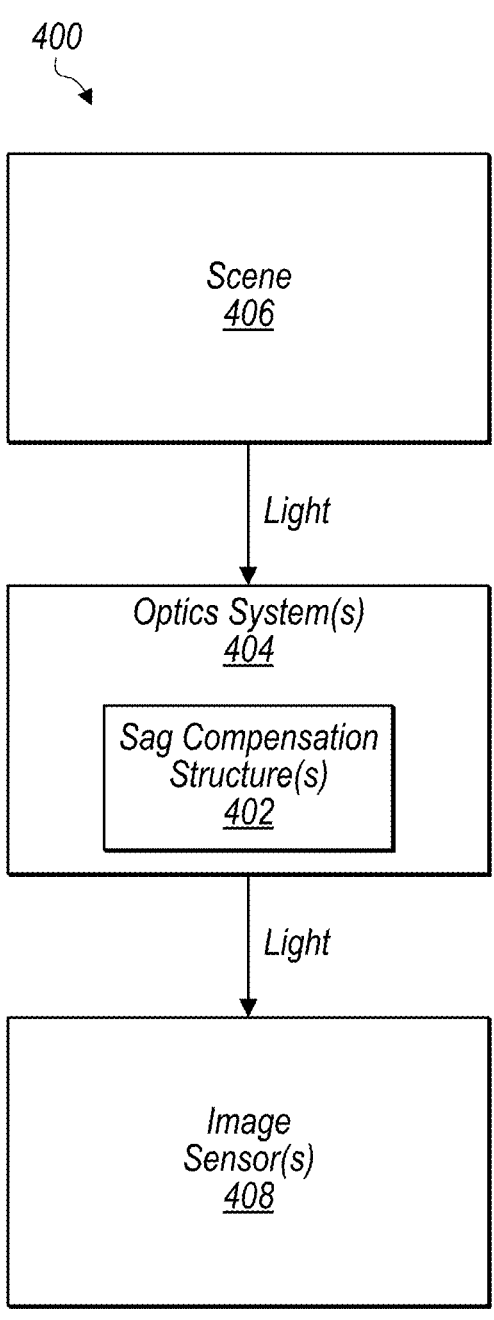
FIG. 4 illustrates a block diagram of an example environment in which a sag compensation structure may be used, in accordance with some embodiments.

FIG. 4 illustrates a block diagram of an example environment 400 in which a sag compensation structure 402 may be used. The example environment 400 may include one or more optics systems 404 (e.g., the optics system 100 in FIGS. 1A-1D, the optics system 200 in FIGS. 2A-2C, etc.) comprising the sag compensation structure 402. Furthermore, the environment 400 may include a scene 406 and/or one or more image sensors 408. In various embodiments, the optics system(s) 404 may receive light emitted (and/or reflected) from the scene 406. In some embodiments, the light may pass through the optics system(s) 404 (including the sag compensation structure(s) 402) and to the image sensor(s) 408, which may be configured to receive the light that has passed through the optics system(s) 404.

According to some embodiments, at least a portion of the optics system(s) 404 and at least a portion of the image sensor(s) 408 may be part of a camera that may be used for capturing images (e.g., still image capture and/or video capture of the scene 406). The sag compensation structure(s) 402 may be included in the camera and/or in one or more optical systems that are not part of the camera.

In some embodiments, the scene 406 may include an electronic display, and the optics system(s) may receive light from the electronic display. Additionally, or alternatively, the image sensor(s) 408 may include a human eye. In some embodiments, one or more portions (e.g., a pupil and/or a lens, etc.) of a human eye may be considered part of the optics system(s) 404 and one or more other portions (e.g., a retina) of the human eye may be considered part of the image sensor(s) 408.

According to some embodiments, the example environment 400 may be a display system that includes a left optics system and a right optics system positioned between a user's eyes and one or more displays. In some embodiments, the scene 406 may be a single display to display content for viewing by both of the user's eyes. In other embodiments, the scene 406 may include multiple displays (e.g., two displays—a left display for a user's left eye and a right display for a user's right eye). The optics system(s) 404 may include the left optics system (e.g., optics system 100 in FIG. 1A) positioned between the scene 406 and the user's left eye, and a right optics system (e.g., optics system 100 in FIG. 1A) positioned between the scene 406 and the user's right eye. In some embodiments, the image sensor(s) 408 may include the user's left eye and/or right eye. According to some embodiments, the display (or a left display), the left optics system, and the user's left eye may be positioned along an optical axis defined by a lens assembly of the left optics system. Additionally, or alternatively, the display (and/or a right display), the right optics system, and the user's right eye may be positioned along an optical axis defined by a lens assembly of the right optics system.

Figure 5:
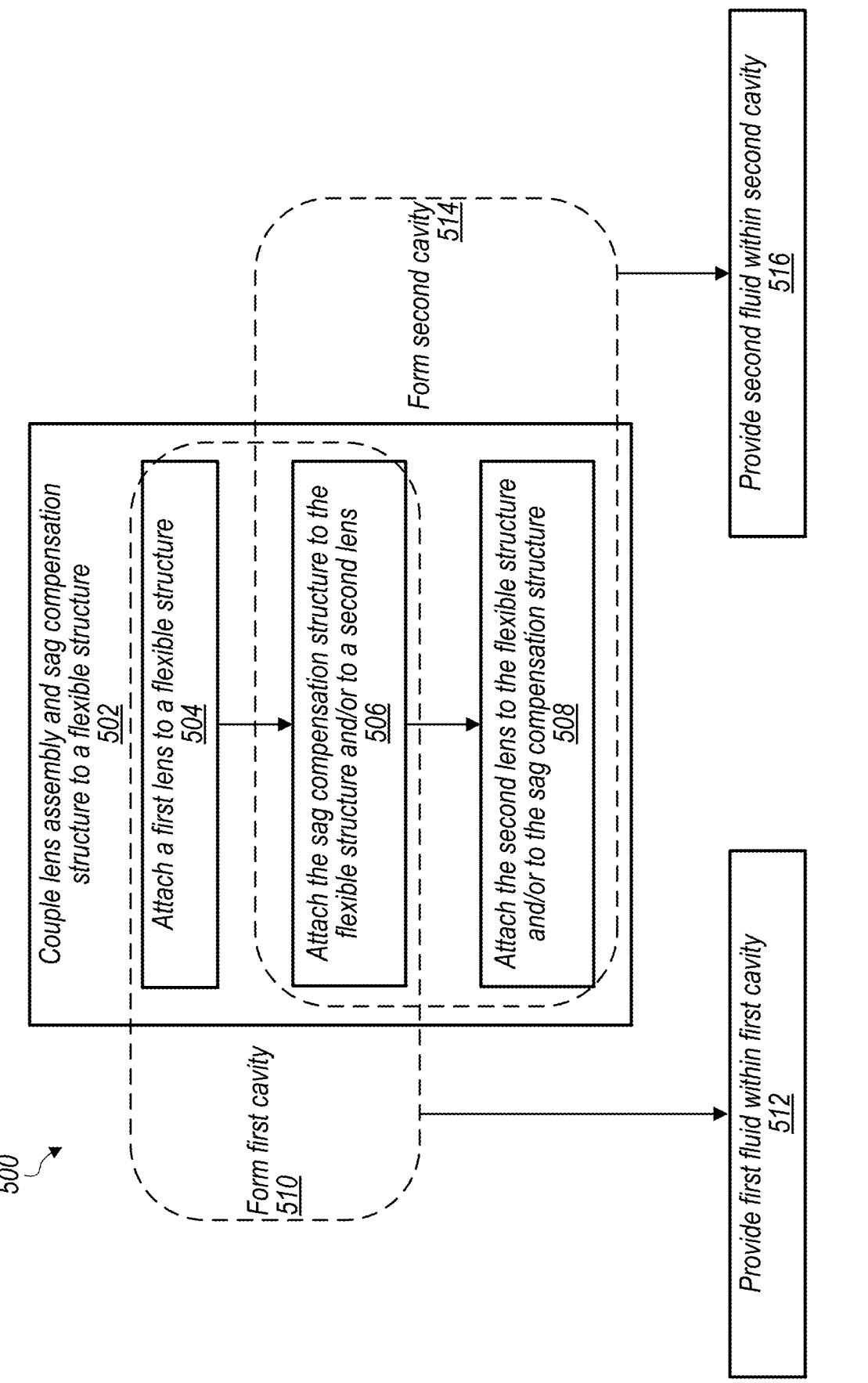
FIG. 5 is a flowchart of an example method of assembling an optics system that may include a sag compensation structure, in accordance with some embodiments.

FIG. 5 is a flowchart of an example method 500 of assembling an optics system (e.g., the optics system 100 in FIGS. 1A-1D, the optics system 200 in FIGS. 2A-2C, etc.) that may include a sag compensation structure. It should be understood that, in some embodiments, the order of the operations of blocks 502-512 may be different than indicated in FIG. 5 via the block numerals and/or the flowchart arrows. Additionally, or alternatively, the method 500 may include fewer or more operations than those indicated by blocks 502-512.

At 502, the method 500 may include coupling a lens assembly and a sag compensation structure to a flexible structure. According to various embodiments, by coupling the lens assembly and the sag compensation structure to the flexible structure, the sag compensation structure may be coupled with the lens assembly. The flexible structure may be configured to allow the first lens and the second lens to move relative to one another. In some embodiments, the lens assembly may include a first lens (e.g., comprising a deformable lens membrane) and/or a second lens. Coupling the lens assembly and the sag compensation structure to the flexible structure (at 502) may include attaching the first lens to the flexible structure (at 504), attaching the sag compensation structure to the flexible structure and/or to the second lens (at 506), and/or attaching the second lens to the flexible structure and/or to the sag compensation structure (at 508). FIG. 1A shows a non-limiting example of an optics system 100 that may be formed by coupling the lens assembly (e.g., the first lens 104 and the second lens 106) and the sag compensation structure 102 to the flexible structure 108.

In some embodiments, attaching (or otherwise coupling) the sag compensation structure to the flexible structure (at 506) may include positioning the sag compensation structure along an optical axis of the lens assembly, e.g., an optical axis defined by the deformable lens membrane. The sag compensation structure may be positioned between the deformable lens membrane and the second lens in various embodiments. The sag compensation structure may be positioned so as to deformably interface with different fluids, e.g., as discussed herein with reference to at least FIGS. 1A-1D and 3.

In some embodiments, attaching the second lens to the flexible structure and/or to the sag compensation structure (at 508) may include placing a curved surface of the second lens against a surface of a sag compensation membrane of the sag compensation structure. For example, the curved surface of the second lens may be placed against a surface of the sag compensation membrane such that the curved surface deforms the sag compensation membrane to conform with a curvature of the curved surface.

According to some embodiments, attaching the first lens to the flexible structure (at 504) and attaching the sag compensation structure to the flexible structure (at 506) may form a first cavity (at 510). In some embodiments, the first cavity may be at least partially defined by the deformable lens membrane, a sag compensation membrane of the sag compensation structure, and/or the flexible structure, such that the first cavity is configured to contain a first fluid between the deformable lens membrane and the sag compensation membrane. At 512, the method 500 may include providing the first fluid within the first cavity.

According to some embodiments, a second cavity may be formed (at 514) between two sag compensation membranes of the sag compensation structure, e.g., as discussed herein with reference to at least FIGS. 1A-1D. In other embodiments, the second cavity may be formed (at 514) between the sag compensation structure and the second lens, e.g., as discussed herein with reference to at least FIG. 3. At 516, the method 500 may include providing the second fluid within the second cavity. As previously mentioned, the second fluid may be different than the first fluid. For example, the second fluid may have a higher density and a lower refractive index than the first fluid.

Figure 6B:
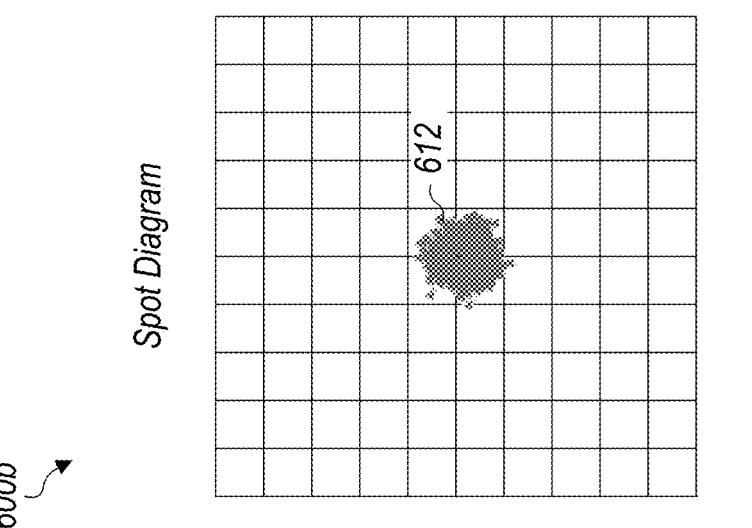
FIGS. 6A-6B illustrate an example optical scenario in which light passes through an optics system (e.g., including a deformable lens membrane and/or a sag compensation structure) without gravity sag, in accordance with some embodiments.
Figure 6A:
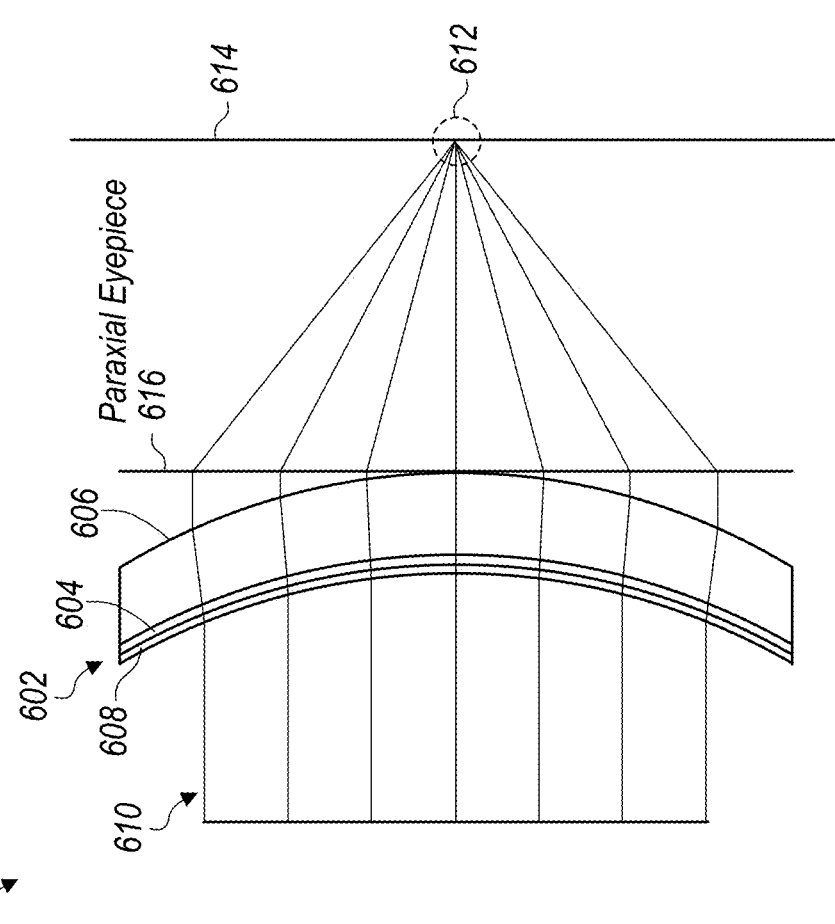

FIGS. 6A-6B illustrate an example optical scenario 600 in which light passes through an optics system 602 (e.g., which may include a deformable lens membrane and/or a sag compensation structure) without gravity sag. FIG. 6A shows a schematic diagram 600a of light rays passing through the optics system. FIG. 6B shows a spot diagram 600b of the light after passing through the optics system.

As indicated in the schematic diagram 600a, the optics system 602 may include a sag compensation structure 604, a first lens 606 (e.g., comprising the deformable lens membrane), and/or a second lens 608. In some examples, the optics system 602 may be similar to, or the same as, the optics system 100 described herein with reference to FIGS. 1A-1D, the optics system 200 described herein with reference to FIGS. 2A-2C, and/or the optics system(s) 404 described herein with reference to FIG. 4. In some embodiments, the optics system 602 may comprise a prescription lens system, in which the first lens 606 may be used for user eye prescription correction (e.g., to correct for myopia, astigmatism, and/or one or more vision deficiencies of an eye). The second lens 608 may be used to correct for one or more optical aberrations (e.g., field curvature) induced by the first lens 606. Light rays 610 passing through the optics system 602 may converge to form a spot pattern 612 at a spot plane 614 that is at a distance from a paraxial eyepiece plane 616, as indicated in FIG. 6A. The spot diagram 600*b* shows the spot pattern 612 of the light rays 610 incident on the spot plane 614 after having passed through the optics system 602. In a non-limiting example, the spot pattern 612 may have a RMS radius of about 5 microns. The spot pattern 612 may be substantially symmetrical. Furthermore, the spot pattern 612 may be concentrated at or near the center of the spot diagram 600*b*.

Figures 7A, 7B:
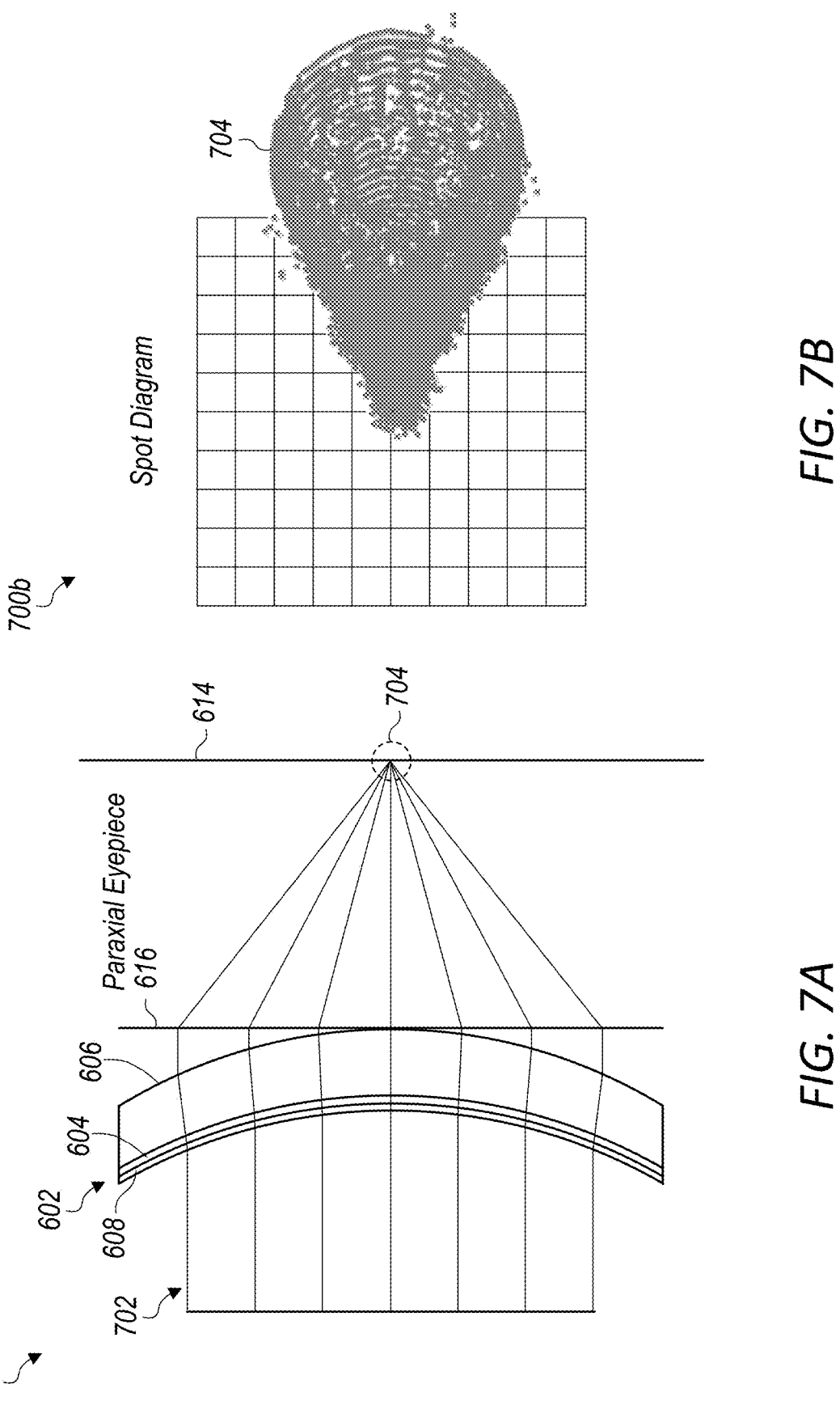
FIGS. 7A-7B illustrate an example optical scenario in which light passes through an optics system (e.g., including a deformable lens membrane and/or a sag compensation structure) with uncompensated gravity sag, in accordance with some embodiments.

FIGS. 7A-7B illustrate an example optical scenario 700 in which light passes through the optics system 602 (e.g., which may include a deformable lens membrane and/or a sag compensation structure) with uncompensated gravity sag. FIG. 7A shows a schematic diagram 700*a* of light rays passing through the optics system 602. FIG. 7B shows a spot diagram 700*b* of the light after passing through the optics system 602. While the optics system 602 is shown in FIG. 7A as including a sag compensation structure 604, the sag compensation structure 604 may be absent from the optics system 602 in this example optical scenario 700, as there is no compensation for gravity sag.

As indicated in the schematic diagram 700*a*, light rays 702 passing through the optics system 602 may converge to form a spot pattern 704 at a spot plane 614 that is at a distance from a paraxial eyepiece plane 616, as indicated in FIG. 7A. The spot diagram 700*b* shows the spot pattern 704 of the light rays 702 incident on the spot plane 614 after having passed through the optics system 602. In some embodiments, due to the (uncompensated) gravity sag of the deformable lens membrane, the RMS radius of the spot pattern 704 may be greater than the RMS radius of the spot pattern 612 shown in the spot diagram 600*b* (FIG. 6B). In a non-limiting example, the spot pattern 704 may have a RMS radius of about 85 microns. The spot pattern 704 may be substantially asymmetrical (e.g., relative to the symmetry of the spot pattern 612 shown in the spot diagram 600*b* (FIG. 6B). For example, a portion of the spot pattern 704 may be offset from the center (e.g., to the right of center in the spot diagram 700*b*) due to the (uncompensated) gravity sag.

Figures 8A, 8B:
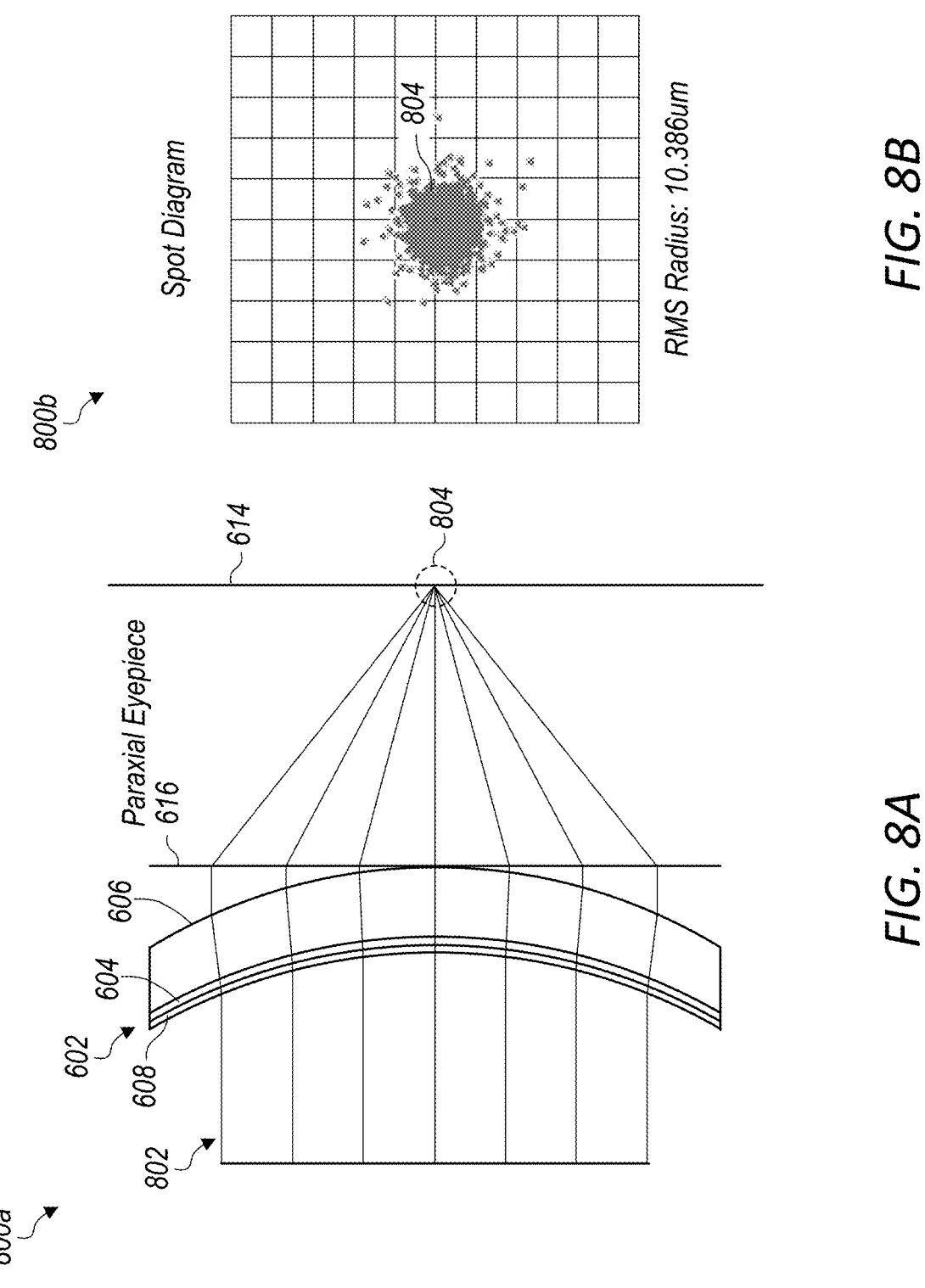
FIGS. 8A-8B illustrate an example optical scenario in which light passes through an optics system (e.g., including a deformable lens membrane and/or a sag compensation structure) with compensated gravity sag, in accordance with some embodiments.

FIGS. 8A-8B illustrate an example optical scenario 800 in which light passes through the optics system 602 (e.g., which may include a deformable lens membrane and/or a sag compensation structure) with compensated gravity sag 602. FIG. 8A shows a schematic diagram 800*a* of light rays passing through the optics system. FIG. 8B shows a spot diagram 800*b* of the light after passing through the optics system 602.

As indicated in the schematic diagram 800*a*, light rays 802 passing through the optics system 602 may converge to form a spot pattern 804 at a spot plane 614 that is at a distance from a paraxial eyepiece plane 616, as indicated in FIG. 8A. The spot diagram 800*b* shows the spot pattern 804 of the light rays 802 incident on the spot plane 614 after having passed through the optics system 602. In some embodiments, due to the gravity sag of the deformable lens membrane being compensated for via the sag compensation structure 604, the RMS radius of the spot pattern 804 may be less than the RMS radius of the spot pattern 704 shown in the spot diagram 700*b* (FIG. 7B). In a non-limiting example, the spot pattern 804 may have a RMS radius of about 10 microns. The spot pattern 804 may be substantially symmetrical (e.g., relative to the asymmetry of the spot pattern 704 shown in the spot diagram 700*b* (FIG. 7B). Furthermore, the spot pattern 704 may be concentrated at or near the center of the spot diagram 800*b*.

Figure 9:
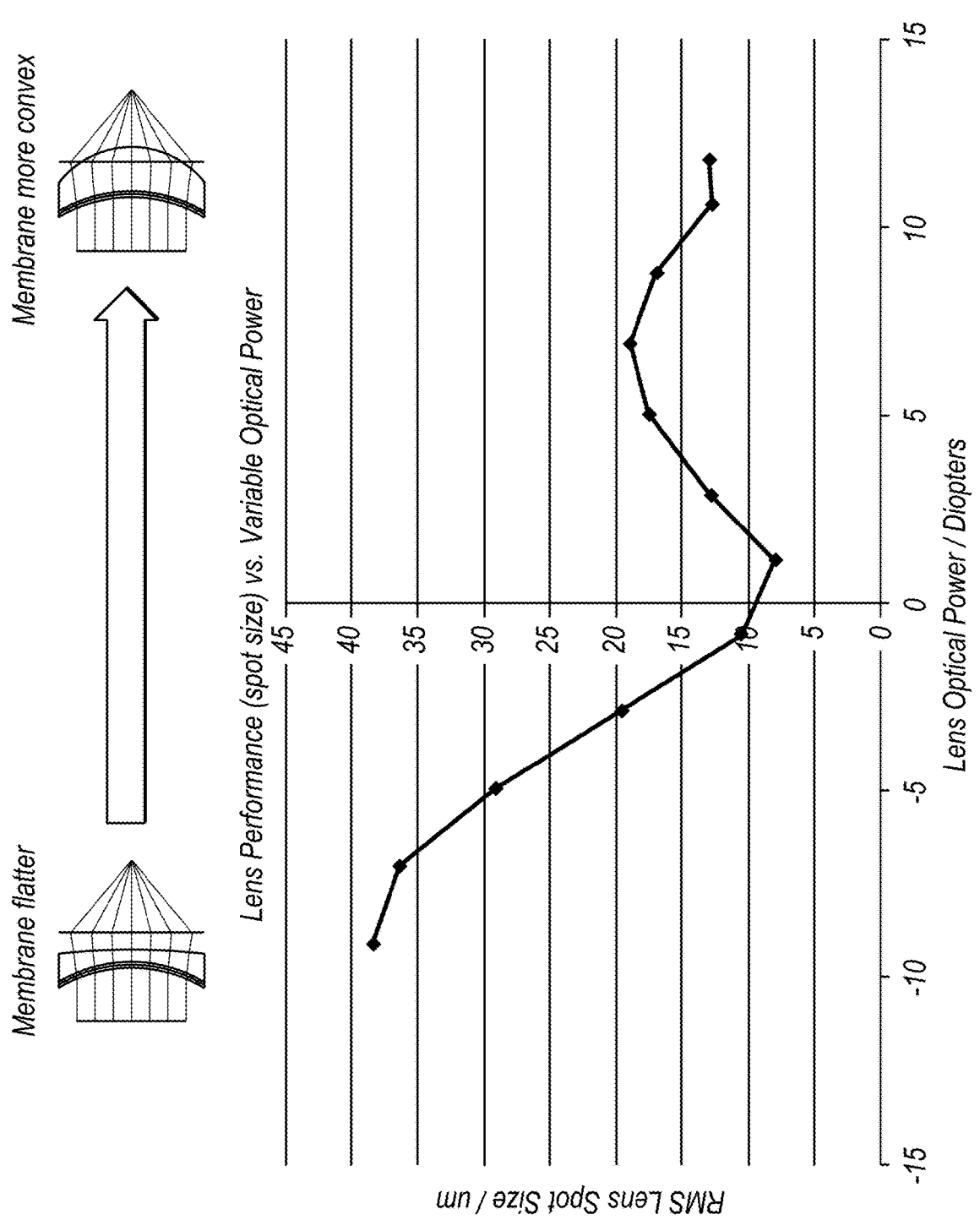
FIG. 9 shows a plot illustrating an example of an optics system's lens performance over a range of optical powers, in which gravity sag of a deformable lens membrane may be compensated using a sag compensation structure, in accordance with some embodiments.

FIG. 9 shows a plot 900 illustrating an example of an optics system's lens performance over a range of optical powers, in which gravity sag of a deformable lens membrane may be compensated using a sag compensation structure (e.g., one or more of the sag compensation structures described herein with reference to at least FIGS. 1A-8B and 10A-12B). The plot 900 indicates that as the deformable lens membrane is deformed from a flat state to an increasingly more convex state (e.g., to vary the optical power of the optics system), the spot size (e.g., RMS radius of a spot pattern) may decrease to a minimum spot size corresponding to an optical power for which the sag compensation structure is optimized in terms of compensating for gravity sag of the deformable lens membrane. Moreover, the plot 900 indicates that further deformation of the deformable lens membrane (e.g., beyond the optical power for which the sag compensation structure is optimized) may cause the spot size to increase. In some non-limiting embodiments, the sag compensation structure may be optimized for an optical power of (or near) zero diopters.

Figures 10A, 10B:
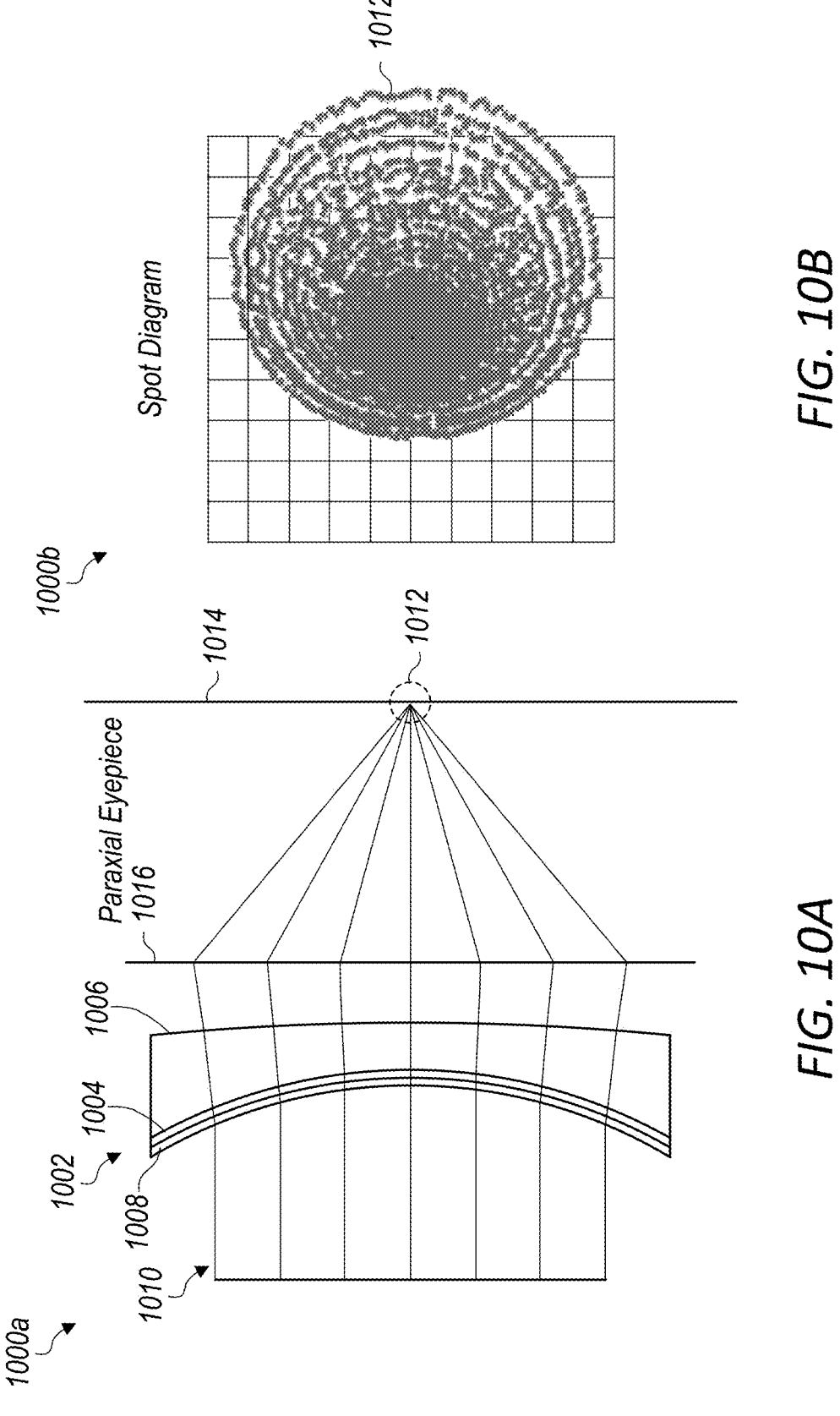
Figures 11A, 11B:
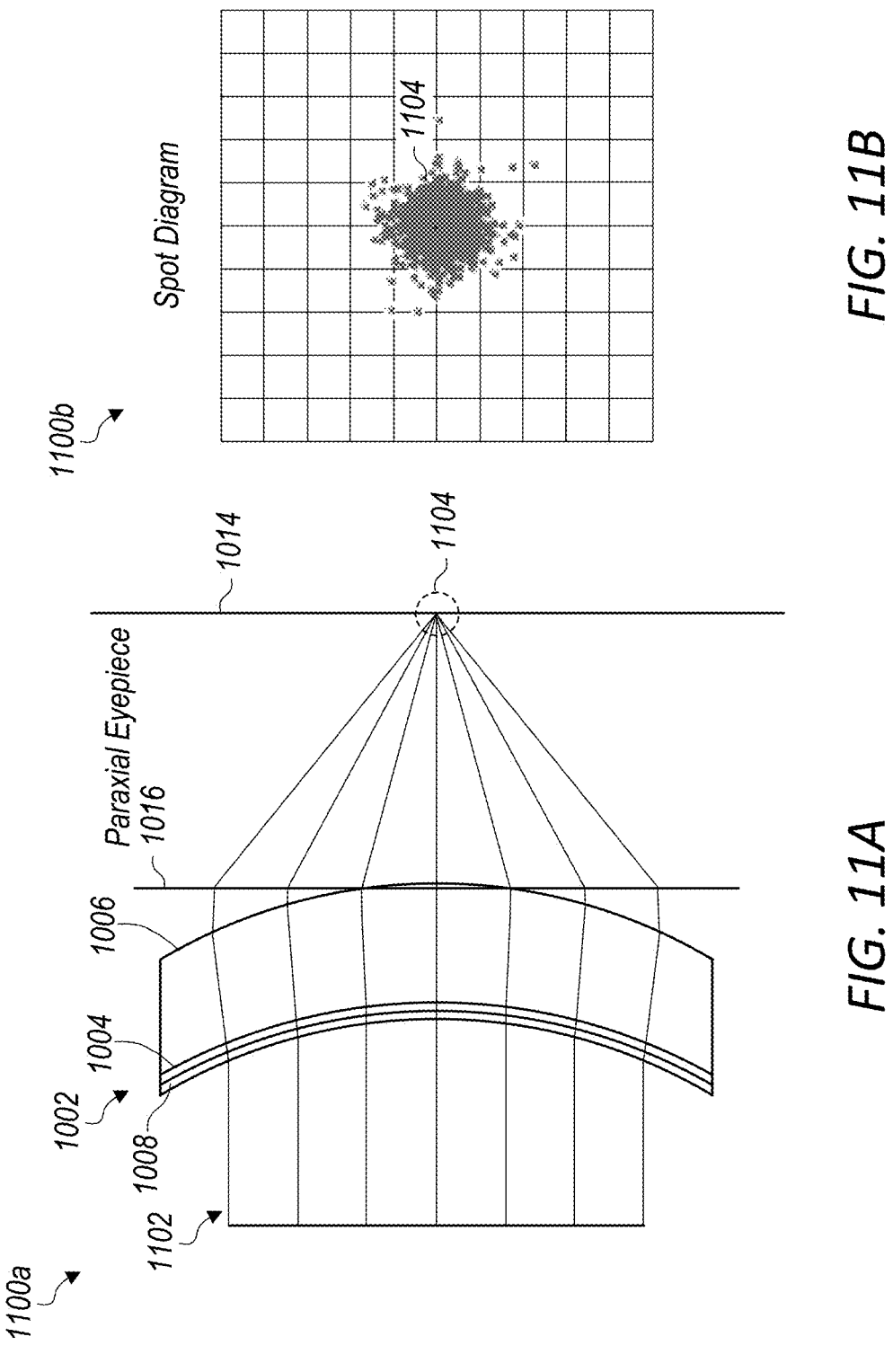
Figures 12A, 12B:
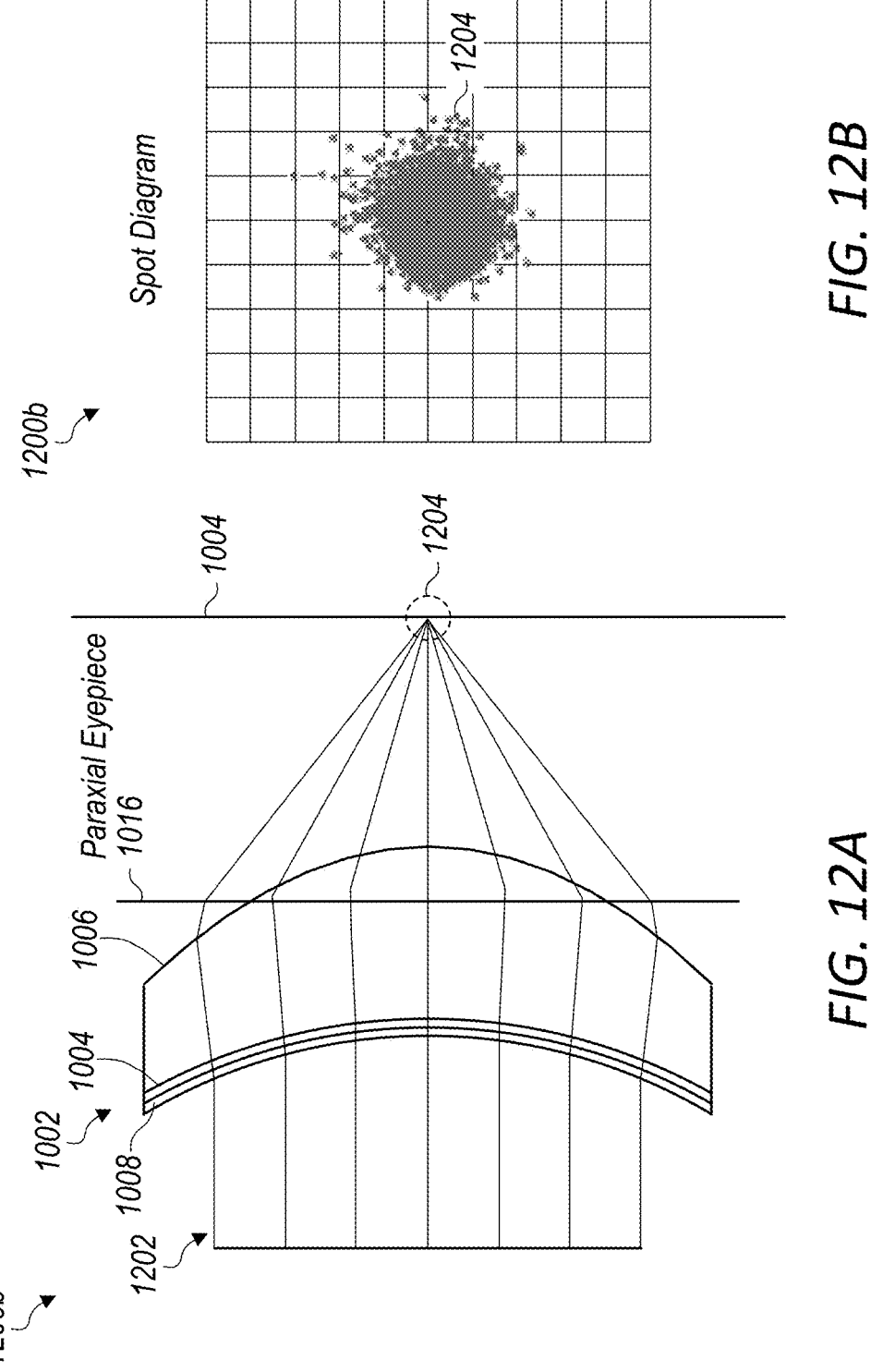

FIGS. 10A-12B illustrate example optical scenarios in which light passes through an optics system 1002 (e.g., which may include a deformable lens membrane and/or a sag compensation structure) with compensated gravity sag at different optical powers, in accordance with some embodiments. FIGS. 10A, 11A, and 12A show schematic diagrams of light rays passing through the optics system 1002 at respective optical powers. FIGS. 10B, 11B, and 12B show spot diagrams of the light after passing through the optics system 1002 at the optical powers corresponding to those of FIGS. 10A, 11A, and 12A, respectively.

Referring to FIGS. 10A-10B, as indicated in the schematic diagram 1000*a* of example optical scenario 1000, the optics system 1002 may include a sag compensation structure 1004, a first lens 1006 (e.g., comprising the deformable lens membrane), and/or a second lens 1008. In some examples, the optics system 1002 may be similar to, or the same as, the optics system 100 described herein with reference to FIGS. 1A-1D, the optics system 200 described herein with reference to FIGS. 2A-2C, the optics system(s) 404 described herein with reference to FIG. 4, and/or the optics system 602 described herein with reference to FIG. 6A. In some embodiments, the optics system 1002 may comprise a prescription lens system, in which the first lens 1006 may be used for user eye prescription correction (e.g., to correct for myopia, astigmatism, and/or one or more vision deficiencies of an eye). The second lens 1008 may be used to correct for one or more optical aberrations (e.g., field curvature) induced by the first lens 1006.

Light rays 1010 passing through the optics system 1002 may converge to form a spot pattern 1012 at a spot plane 1014 that is at a distance from a paraxial eyepiece plane 1016, as indicated in FIG. 10A. The spot diagram 1000*b* shows the spot pattern 1012 of the light rays 1010 incident on the spot plane 1014 after having passed through the optics system 1002. In a non-limiting example, a ring surrounding and attached to the deformable lens membrane may be deflected by 0.5 mm to cause a small amount of deformation of the deformable lens membrane. As indicated in the schematic diagram 1000*a*, the first lens 1006 (comprising the deformable lens membrane) is substantially flat. As discussed with reference to FIG. 9, the flatter the state of a deformable lens membrane that is compensated for gravity sag using a sag compensation structure, the larger the spot size may be in some embodiments. In this non-limiting example, the spot pattern 1012 may have a RMS radius of about 38 microns.

Referring also to FIGS. 11A-11B, as indicated in the schematic diagram 1100*a*, light rays 1102 passing through the optics system 1002 may converge to form a spot pattern 1104 at a spot plane 1014 that is at a distance from a paraxial eyepiece plane 1016, as indicated in FIG. 11A. The spot diagram 1100*b* shows the spot pattern 1104 of the light rays 1102 incident on the spot plane 1014 after having passed through the optics system 1002. In a non-limiting example, the ring surrounding the deformable lens membrane may be deflected by 3.0 mm, which may cause the deformable lens membrane to deform by a greater amount than the deformation caused by the 0.5 mm deflection in the example optical scenario 1000 (see FIG. 10A). As discussed with reference to FIG. 9, as the deformable lens membrane is deformed from a flat state to an increasingly more convex state, the spot size may decrease as the optical power for which the sag compensation structure is approached. In this non-limiting example, the spot pattern 1104 may have a RMS radius of about 8 microns, a smaller spot size than the spot pattern 1012 resulting from the relatively flatter deformable lens membrane state in the example optical scenario 1000.

Referring also to FIGS. 12A-12B, as indicated in the schematic diagram 1200*a*, light rays 1202 passing through the optics system 1002 may converge to form a spot pattern 1204 at a spot plane 1014 that is at a distance from a paraxial eyepiece plane 1016, as indicated in FIG. 12A. The spot diagram 1200*b* shows the spot pattern 1204 of the light rays 1202 incident on the spot plane 1014 after having passed through the optics system 1002. In a non-limiting example, the ring surrounding the deformable lens membrane may be deflected by 5.5 mm, which may cause the deformable lens membrane to deform by a greater amount than the deformation caused by the 3.0 mm deflection in the example optical scenario 1100 (see FIG. 11A). As discussed with reference to FIG. 9, as the deformable lens membrane further deforms (e.g., beyond the optical power for which the sag compensation structure is optimized), the spot size may increase. In this non-limiting example, the spot pattern 1204 may have a RMS radius of about As discussed with reference to FIG. 9, as the deformable lens membrane is deformed from a flat state to an increasingly more convex state, the spot size may decrease as the optical power for which the sag compensation structure is approached. In this non-limiting example, the spot pattern 1204 may have a RMS radius of about 13 microns, a bigger spot size than the spot pattern 1104 resulting from the relatively less convex deformable lens membrane state in the example optical scenario 1100.

Figure 13:
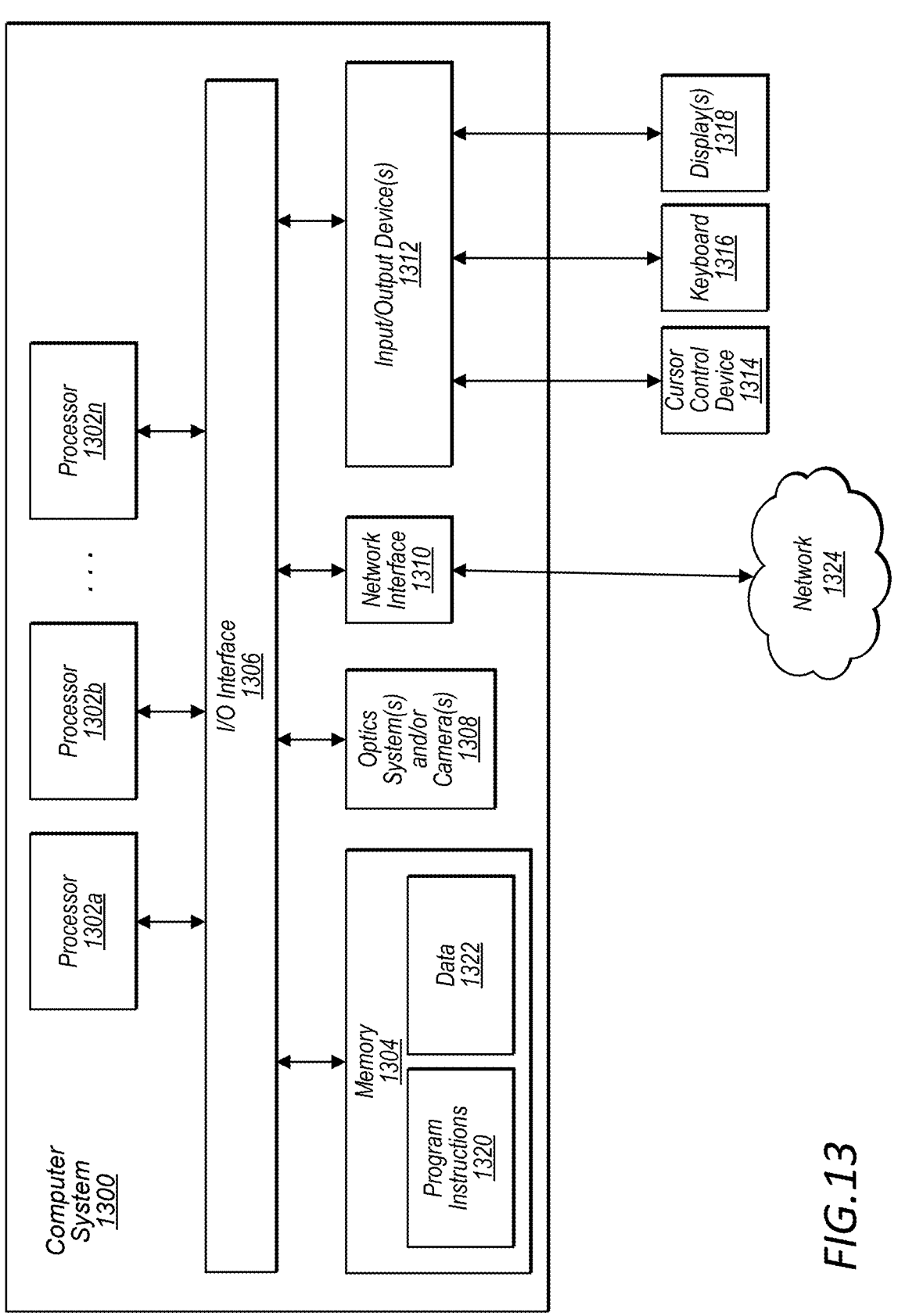
FIG. 13 illustrates an example computer system that may include an optics system with a sag compensation structure, in accordance with some embodiments.

FIG. 13 illustrates an example computing device, referred to as computer system 1300, that may include or host embodiments of an optics system that may include a deformable lens membrane and a sag compensation structure. e.g., as described herein with reference to FIGS. 1A-12B. In addition, computer system 1300 may implement methods for controlling operations of the optics system.

The computer system 1300 may be configured to execute any or all of the embodiments described above. In different embodiments, computer system 1300 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 1300 includes one or more processors 1302 coupled to a system memory 1304 via an input/output (I/O) interface 1306. Computer system 1300 further includes one or more optics systems (and/or one or more cameras) 1308 coupled to the I/O interface 1306. Computer system 1300 further includes a network interface 1310 coupled to I/O interface 1306, and one or more input/output devices 1312, such as cursor control device 1314, keyboard 1316, and display(s) 1318. In some cases, it is contemplated that embodiments may be implemented using a single instance of computer system 1300, while in other embodiments multiple such systems, or multiple nodes making up computer system 1300, may be configured to host different portions or instances of embodiments. For example, in one embodiment some elements may be implemented via one or more nodes of computer system 1300 that are distinct from those nodes implementing other elements.

In various embodiments, computer system 1300 may be a uniprocessor system including one processor 1302, or a multiprocessor system including several processors 1302 (e.g., two, four, eight, or another suitable number). Processors 1302 may be any suitable processor capable of executing instructions. For example, in various embodiments processors 1302 may be general-purpose or embedded processors implementing any of a variety of instruction set architectures (ISAs), such as the x86, PowerPC, SPARC, or MIPS ISAs, or any other suitable ISA. In multiprocessor systems, each of processors 1302 may commonly, but not necessarily, implement the same ISA.

System memory 1304 may be configured to store program instructions 1320 accessible by processor 1302. In various embodiments, system memory 1304 may be implemented using any suitable memory technology, such as static random access memory (SRAM), synchronous dynamic RAM (SDRAM), nonvolatile/Flash-type memory, or any other type of memory. Additionally, existing camera control data 1322 of memory 1304 may include any of the information or data structures described above. In some embodiments, program instructions 1320 and/or data 1322 may be received, sent or stored upon different types of computer-accessible media or on similar media separate from system memory 1304 or computer system 1300. In various embodiments, some or all of the functionality described herein may be implemented via such a computer system 1300.

In one embodiment, I/O interface 1306 may be configured to coordinate I/O traffic between processor 1302, system memory 1304, and any peripheral devices in the device, including network interface 1310 or other peripheral interfaces, such as input/output devices 1312. In some embodiments, I/O interface 1306 may perform any necessary protocol, timing or other data transformations to convert data signals from one component (e.g., system memory 1304) into a format suitable for use by another component (e.g., processor 1302). In some embodiments, I/O interface 1306 may include support for devices attached through various types of peripheral buses, such as a variant of the Peripheral Component Interconnect (PCI) bus standard or the Universal Serial Bus (USB) standard, for example. In some embodiments, the function of I/O interface 1306 may be split into two or more separate components, such as a north bridge and a south bridge, for example. Also, in some embodiments some or all of the functionality of I/O interface 1306, such as an interface to system memory 1304, may be incorporated directly into processor 1302.

Network interface 1310 may be configured to allow data to be exchanged between computer system 1300 and other devices attached to a network 1324 (e.g., carrier or agent devices) or between nodes of computer system 1300. Network 1324 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1310 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1312 may, in some embodiments, include one or more display terminals, keyboards, keypads, touchpads, scanning devices, voice or optical recognition devices, or any other devices suitable for entering or accessing data by one or more computer systems 1300. Multiple input/output devices 1312 may be present in computer system 1300 or may be distributed on various nodes of computer system 1300. In some embodiments, similar input/output devices may be separate from computer system 1300 and may interact with one or more nodes of computer system 1300 through a wired or wireless connection, such as over network interface 1310.

Those skilled in the art will appreciate that computer system 1300 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1300 may be transmitted to computer system 1300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
   a first lens comprising a deformable lens membrane that defines an optical axis;
   a second lens positioned along the optical axis, wherein the second lens has a fixed shape, wherein a first surface of the second lens is convex towards the first lens along the optical axis, and wherein a second surface of the second lens is concave toward the first lens along the optical axis; and
   a sag compensation structure, comprising a sag compensation membrane positioned, along the optical axis, between the first lens and the second lens, wherein the first surface of the second lens is placed against the sag compensation structure such that the first surface of the second lens abuts a surface of the sag compensation membrane causing the sag compensation membrane to deform in a shape towards the first lens conforming with a curvature of the first surface of the second lens;

a coupling structure attached to the deformable lens membrane, and wherein the coupling structure extends around a periphery of the first lens;

a plurality of actuators attached at different points around the periphery of the coupling structure, wherein the plurality of actuators are individually controllable at the different points to cause movement of the coupling structure at the different points with respect to the second lens and the sag compensation structure, wherein the movement of the coupling structure at least along the optical axis causes the first lens to move at least along the optical axis changing an optical power of the first lens;

a flexible structure fixedly coupled with the first lens, the second lens, and the sag compensation structure, wherein:

the flexible structure comprises bellows that allow relative movement between the first lens, the second lens, and the sag compensation structure; and the sag compensation membrane deformably interfaces with:

a first fluid contained between the deformable lens membrane, the deformed sag compensation membrane, and a first portion of the flexible structure; and a second fluid contained between the deformed sag compensation membrane, the second lens, and a second portion of the flexible structure, wherein the second fluid is different than the first fluid; and the sag compensation structure compensates, based at least in part on further deformation of the sag compensation membrane, for gravity sag of the deformable lens membrane, wherein the compensation is caused by displacements of the second fluid caused by gravity and affected by the deformed shape of the sag compensation membrane, further deforming the shape of the sag compensation membrane, wherein the further deformation of the shape of the sag compensation membrane interfaces with the first fluid and affects displacements of the first fluid, wherein the affected displacements of the first fluid interface with the deformable lens membrane causing the compensation of gravity sag of the deformable lens membrane, and wherein the relative movement of the flexible structure allows for the respective displacements of the first fluid and the second fluid.

2. The device of claim 1, wherein:

the first fluid has a different density than the second fluid; and the first fluid has a different refractive index than the second fluid.

3. The device of claim 1, wherein:

the sag compensation membrane is a first sag compensation membrane;

the sag compensation structure further comprises:

a second sag compensation membrane positioned, along the optical axis, between the first sag compensation membrane and the second lens; and the second fluid is contained between the first sag compensation membrane and the second sag compensation membrane.

4. The device of claim 3, wherein the sag compensation structure further comprises:

one or more side walls that extend between the first sag compensation membrane and the second sag compensation membrane, wherein the one or more side walls are at least part of the second portion of the flexible structure;

wherein the second fluid is contained within a cavity defined by the first sag compensation membrane, the second sag compensation membrane, and the one or more side walls.

5. The device of claim 1, wherein the bellows of the flexible structure allow the movement of the coupling structure at the different points with respect to the second lens and the sag compensation structure.

6. The device of claim 5, further comprising:

a display that emits light to present digital content, wherein the display is oriented such that the light passes through the first lens to the sag compensation structure, through the sag compensation structure to the second lens, and through the second lens; and one or more processors to:

cause the display to present digital content; and cause the plurality of actuators to move the at least one of the first lens or the second lens.

7. An optics system, comprising:

a sag compensation structure, comprising:

a sag compensation membrane; and a one or more side walls for coupling the sag compensation structure with a lens assembly, wherein the lens assembly includes:

a first lens comprising a deformable lens membrane that defines an optical axis; and a second lens positioned along the optical axis, wherein the second lens has a fixed shape, wherein a first surface of the second lens is convex toward the first lens along the optical axis, and wherein a second surface of the second lens is concave toward the first lens along the optical axis; and wherein the first surface of the second lens is placed against the sag compensation structure such that the first surface of the second lens abuts a surface of the sag compensation membrane causing the sag compensation membrane to deform in a shape towards the first lens conforming with a curvature of the first surface of the second lens; and the deformed sag compensation membrane is positioned, along an optical axis of the lens assembly, between the first lens and the second lens, and wherein the one or more side walls comprises one or more bellows that allow relative movement between the first lens, the second lens, and the sag compensation structure;

a coupling structure attached to the deformable lens membrane, and wherein the coupling structure extends around a periphery of the first lens;

a plurality of actuators attached at different points around the periphery of the coupling structure, wherein the plurality of actuators are individually controllable at the different points to cause movement of the coupling structure at the different points with respect to the second lens and the deformable sag compensation membrane, wherein the movement of the coupling structure at least along the optical axis causes the first lens to move at least along the optical axis changing an optical power of the first lens;

wherein the deformed sag compensation membrane is to deformably interface with:

a first fluid contained between the deformable lens membrane, the deformed sag compensation membrane, and the one or more side walls; and a second fluid is between the deformed sag compensation membrane, the second lens, and the one or more side walls, wherein the second fluid is different than the first fluid; and wherein the sag compensation structure is to compensate, based at least in part on further deformation of the sag compensation membrane, for gravity sag of the deformable lens membrane, wherein the compensation is caused by displacements of the second fluid caused by gravity and affected by the deformed shape of the sag compensation membrane, further deforming the shape of the sag compensation membrane, wherein the further deformation of the shape of the sag compensation membrane interfaces with the first fluid and affects displacements of the first fluid, wherein the affected displacements of the first fluid interface with the deformable lens membrane causing the compensation of gravity sag of the deformable lens membrane, and wherein relative movement of the one or more side walls allows for the respective displacements of the first fluid and the second fluid.

8. The optics system of claim 7, wherein:

the sag compensation membrane is a first sag compensation membrane;

the sag compensation structure further comprises:

a second sag compensation membrane positioned, along the optical axis, between the first sag compensation membrane and the second lens; and the one or more side walls that extend between the first sag compensation membrane and the second sag compensation membrane; and the second fluid is contained within a cavity defined by the first sag compensation membrane, the second sag compensation membrane, and the one or more side walls.

9. The optics system of claim 7, wherein the second fluid has a higher density than the first fluid.

10. The optics system of claim 9, wherein the second fluid has a lower refractive index than the first fluid.

11. The optics system of claim 7, further comprising:

the first lens;

the second lens; and the one or more side walls, comprising:

a first portion attached to the first lens;

a second portion attached to the second lens; and an intermediate portion extending between the first portion and the second portion;

wherein the one or more side walls allow the relative movement between the first lens and the second lens.

12. The optics system of claim 11, further comprising:

the first fluid;

wherein the first fluid is contained within a cavity defined by the first lens, the sag compensation membrane, and a portion of the one or more side walls including the first portion and the intermediate portion.

13. The optics system of claim 11, wherein the one or more side walls comprising the one or more bellows are a flexible structure.

14. The optics system of claim 11, wherein the second lens comprises a meniscus lens.

15. A method of assembling an optics system, the method comprising:

coupling a sag compensation structure with a lens assembly that includes:

a first lens comprising a deformable lens membrane that defines an optical axis;

and a second lens having a fixed shape, wherein a first surface of the second lens is convex toward the first lens along the optical axis, and wherein a second surface of the second lens is concave toward the first lens along the optical axis; and wherein the sag compensation structure comprises a sag compensation membrane;

a coupling structure attached to the deformable lens membrane, and wherein the coupling structure extends around a periphery of the first lens;

a plurality of actuators attached at different points around the periphery of the coupling structure, wherein the plurality of actuators are individually controllable at the different points to cause movement of the coupling structure at the different points with respect to the second lens and the sag compensation structure, wherein the movement of the coupling structure at least along the optical axis causes the first lens to move at least along the optical axis changing an optical power of the first lens;

the coupling comprises:

a flexible structure comprising one or more bellows allowing relative movement of the flexible structure; and attaching the sag compensation structure to the flexible structure along an optical axis of the lens assembly, such that a first surface of the second lens is placed against the sag compensation structure such that the first surface of the second lens abuts a surface of the sag compensation membrane causing the sag compensation membrane to deform in a shape towards the first lens conforming with a curvature of the first surface of the second lens, and wherein the sag compensation membrane is positioned to deformably interface with:

a first fluid contained between the deformable lens membrane, the deformed sag compensation membrane, and the flexible structure; and a second fluid contained between the deformed sag compensation membrane, the second lens, and the flexible structure, wherein the second fluid is different than the first fluid;

wherein the sag compensation structure is to compensate, based at least in part on further deformation of the sag compensation membrane, for gravity sag of the deformable lens membrane, wherein the compensation is caused by displacements of the second fluid caused by gravity and affected by the deformed shape of the sag compensation membrane, further deforming the shape of the sag compensation membrane, wherein the further deformation of the shape of the sag compensation membrane interfaces with the first fluid and affects displacements of the first fluid, wherein the affected displacements of the first fluid interface with the deformable lens membrane causing the compensation of gravity sag of the deformable lens membrane, and wherein the relative movement of the flexible structure allows for the respective displacements of the first fluid and the second fluid.

16. The method of claim 15, further comprising:

providing the first fluid within a first cavity at least partially defined by the deformable lens membrane and a first surface of the sag compensation membrane; and providing the second fluid within a second cavity at least partially defined by a second surface of the sag compensation membrane, wherein the second fluid has a higher density than the first fluid.

17. The method of claim 16, wherein:

the sag compensation membrane is a first sag compensation membrane;

the second cavity is further at least partially defined by a second sag compensation membrane of the sag compensation structure, wherein the second sag compensation membrane is positioned along the optical axis; and the second fluid has a lower refractive index than the first fluid.

18. The method of claim 15, further comprising:

attaching the first lens to the flexible structure; and attaching the second lens to the flexible structure, wherein the relative movement of the flexible structure allows the first lens and the second lens to move relative to one another.

\* \* \* \* \*